April 15, 1941.  F. VÁSÁRHELYI ET AL  2,238,836
RAIL JOINT
Filed Jan. 25, 1937
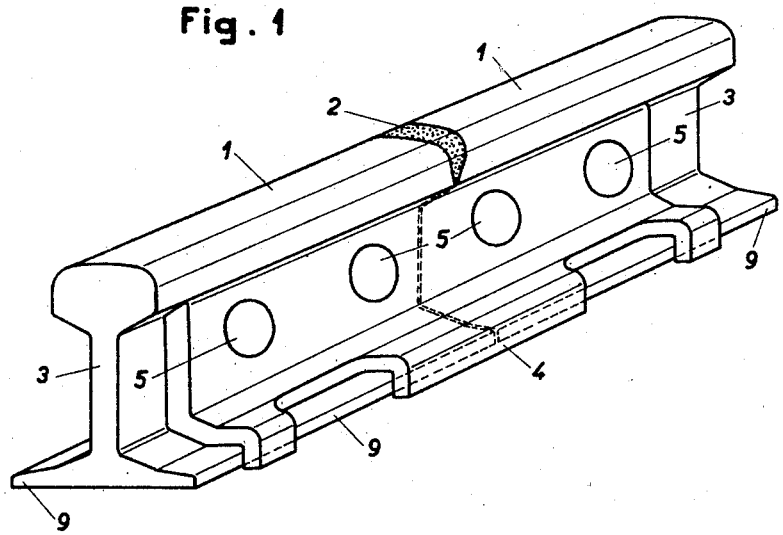
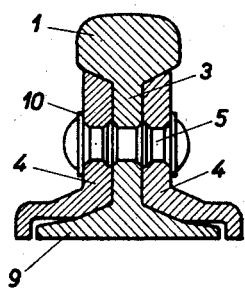
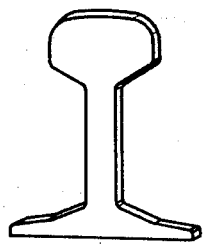
Inventors
Franz Vasarhelyi and
Franz Sajovsky
By J. B. Singer, atty.

Patented Apr. 15, 1941

2,238,836

UNITED STATES PATENT OFFICE 2,238,836

RAIL JOINT

Franz Vásárhelyi and Franz Tajovsky, Vienna, Austria, assignors to the firm Langschienen Gesellschaft m. b. H., Vienna, Austria, a company of Austria Application January 25, 1937, Serial No. 122,274
In Austria October 2, 1936

2 Claims. (Cl. 238—164)

This invention relates to rail joints of the type in which the stresses at the joints are carried principally by fish plates riveted to the sides of the rails at the joints.

The increasing rate of travel on railways also applies increasing stresses to the rails and this requires improvement in the strength of the rail joints. The design and mode of attachment of the fish plates are factors of decisive importance as far as the strength of the rail joint is concerned. Attempts have been made to avoid gaps between the butting ends of the rails by welding the rails either together or to the fish plates, and to enhance the mechanical strength of the weld by reinforcement with the aid of straps welded to the foot and web of the rail. However, the weld seams connecting the straps to the rail tend in their turn to weaken the joint as a whole, since the rail is damaged along the weld seam producing a weakening of the rail which is similar to that which would result from a grooving of the rail along the line of the weld seam. A primary condition for a good rail joint is that the means of attaching the fish plates shall have the greatest resistance or be subjected to the least specific stress. The attaching of the fish plates by means of rivets would appear to be best suited for the purpose, since rivets fit snugly against the walls of the holes in the parts to be connected together and in consequence are only subjected to shearing stress. However, in the ordinary joints employing fish plates riveted to the end portions of the rails, the points of weakness, that is, the points most apt to fail when subjected to heavy stress, have been the rivet shanks at the planes of contact between the rail webs and fish plates as this is the plane in which the shearing stress is applied to the rivets. As the cross-sectional areas of the rivets at these planes have heretofore been smaller than that of the fish plates, the rivet shanks were subjected to the greatest specific shearing stress and, consequently, were sheared off when subjected to excessive loads. To reduce the specific shearing stress applied to the rivet shanks, more rivets could apparently be used, but, as is well known, the number of rivets which can be used in a certain length of fish plate is limited as otherwise the fish plate would be excessively weakened by the reduction of cross section resulting from the rivet holes being spaced too closely together. To avoid this, it would be possible to use longer fish plates and distribute the larger number of rivets at greater intervals along their length. This solution of the problem would, however, involve a considerably greater expense, as it is well known that the fish plates are a principal item in the cost of rail joints. Furthermore, the cost of the labor involved in applying the larger number of rivets also would further increase the cost of the joints. According to the solution of the problem provided by the present invention, it is possible to use fish plates of relatively short length, and therefore lower cost, and at the same time reduce the specific shear applied to the rivet shanks at the critical planes by increasing the cross-sectional area of the shanks at these planes without materially reducing the cross-sectional area of the fish plates. According to the invention, the resistance of the rivet to shearing stress may be increased without increasing the initial section of the shaft of the rivet by enlarging the rivet hole in the vicinity of the butt joint between any two parts to be joined together and forcing the material of the shaft of the rivet into such enlarged portions of the rivet hole in the operation of upsetting the rivet. In order to ensure that the rivets will be subjected solely to shearing stress without any additional bending moments fish plates are employed which fit snugly against the web of the rails. In accordance with the invention, preferably, the fish plates also bear against the head or foot portions of the rails or against both portions. In this manner the fish plates effect uniform distribution of the stress to all the rivets, so that no excessive straining of any individual rivets occurs.

For the purpose of filling up the gap at the joint, the rail heads are welded together. The weld connecting the rail heads together is relieved of stress by the fish plates and acts mainly as a running surface.

For the purpose of welding the rail heads it is not advisable to employ welding methods which involve temperatures near the melting point of the material of which the parts to be welded together are made, such as for example the thermite method, resistance welding, or the like, since the high temperature alters the molecular structure of the material of the rails to such an extent that the desired or prescribed mechanical strength is impaired and the welds have the same effect as grooves in the rails.

The different parts of the rail, such as the head, the web, and the foot are of different cross-sectional mass, that is to say have different cross-sectional outlines and different cross-sectional areas; the heating and subsequent cooling or setting of head, web, and foot thus require different lengths of time. This implies uneven shrinkage of the different welded cross-sections, with the result that internal stresses are set up in the material, which are capable of giving rise to a sudden fracture at the weld on the occurrence of even a slight increase in the normal stresses to which the joint is subjected under ordinary working conditions. For this reason it is preferable to employ welding methods which involve less heat generation, that is to say the cold welding methods, for example arc welding or oxy-acetylene or the like autogeneous welding, which only generate but slight quantities of heat, and which work as far as possible without fusing of the material of the work.

The fish plates are preferably connected together by means of rivets driven in hot. A particularly firm and secure joint is obtained when the rivet heads are welded to the fish plate at certain points or around the entire circumference.

Since in accordance with the invention the rivets are inserted at red heat the shaft of the rivet completely fills out the hole when upset in the riveting operation, so that by this expedient alone very great rigidity and strength of the entire assembly is obtained. In cooling, the rivets press the fish plates with great force against the rails.

If the joint is effected with the aid of rivets having their heads welded to the fish plate, the fish plates and rivets constitute a rigid uniform body which joins the rail ends together with inherent pressure. It is practically impossible for slackening or loosening of the joint to occur as a result of the vibrations and jars to which it is subjected in use.

Before the fish plates are attached to the rails the contacting surfaces are coated with an anti-rust agent, or there are inserted between the fish plates and the rails thin sheets or slabs, for example of soft metal or other jointing material, which is deformable, to prevent moisture from finding its way in between the contacting metal surfaces.

The rivet holes in the fish plates may be of any desired shape, for example round or polygonal in section. Towards the side at which the head of the rivet will lie on either side the holes are reamed or otherwise widened out or flared, so that during the operation of riveting, the red hot rivet shaft assumes the shape of the rivet hole and expands towards the head, with the result that the admissible stress on the head of the rivet is very considerably greater than it otherwise would be.

To obtain the increased resistance to shearing stress, the rivet holes are also enlarged at the joints between the rail and the fish plate, the enlargement increasing towards the plane of contact between these parts. The rivet, which is upset while in a red hot condition, also fills out these enlarged portions of the rivet hole, with the result that a thicker head is formed at the point at which the rivet is subjected to shearing stress, while at the joints between the fish plates and the rails the shaft of the rivet becomes enlarged in cross-section. The beading thus formed on the shaft of the rivet remains intact even when the head of the rivet is torn off and falls out, and thus acts as a safety device for preventing displacement of the interconnected parts in the event of damage to the rivets.

If it is desired to convert existing rail joints with bolted-on fish plates into rail joints in accordance with the present invention it is merely necessary to fill out the gap at the joint by means of a profiled filling or distancing piece which is held at its head and foot portions by the fish plate.

A form of construction embodying the invention is shown by way of example in the accompanying drawing, in which:

Fig. 1 shows the rail joint according to the invention, in perspective view.

Fig. 2 is a transverse section of the joint with a rivet expanded by upsetting of the material of its shaft into enlarged portions of the rivet hole.

Fig. 3 shows a profiled filling piece, in perspective view.

Referring to the drawing, the ends of the rails to be joined together abut one against the other. The rail heads 1 are bevelled or chamfered off as to their end surfaces, so that a V-shaped welding gap 2 tapering or opening out upwards is formed, which is filled out in the welding operation. The butt joint between the rail ends is bridged on both sides by fish plates 4 of comparatively short length which bear against the web 3 of the rails, and which are adapted to fit the shape of the sides of rails exactly and to bear both against the web and also against the head and foot portions of the rail with accurate fit. Through both the fish plates and the rail holes are drilled for the reception of the rivets 5. The holes in the fish plates and rails are countersunk at both sides, so that they are flared towards the outside. In the course of the upsetting operation, the rivets, which are inserted in a red hot condition, fill out the voids formed by the counter-sinks, with the result that the rivets, in consequence of the formation of an annular beading at the butt joint between fish plate and web of the rail, have enlarged cross-sectional area and therefore increased resistance to shearing stress at this point, thus reducing the number of rivets that need be used which in turn reduces the length of the fish plates required. The resulting thickening of the shaft of the rivet towards the head of the rivet results in more favourable stressing of the head of the rivet.

It is advantageous to compress a ring or washer 10 behind the rivet head in the act of upsetting. In this manner the edge of the rivet head is prevented from eating its way into the material of the fish plate and weakening it during the riveting operation. The flat ring 10, which becomes slightly cupped, acts as a rounding off.

The tapered countersinks in the fish plates and in the web of the rail at the shearing joint may be formed, at the place of assembly, by milling out the parts prepared for riveting.

In order to protect the riveted joints from the effects of moisture, jointing plates of soft metal are inserted between the fish plates and the web of the rail, or the rails and fish plates are provided, at their contacting surfaces, with a coating of rustproof paint or anti-rust composition.

The life of the rail joint is still further prolonged, in accordance with the invention, by welding the rivet heads to the fish plates either around their entire circumference or at certain points only.

The feet 9 of the rails may likewise be welded together; this is not however absolutely necessary, since the strength of the joint is not materially increased thereby.

In welding the rails, preferably, welding rods of different degrees of hardness are employed, for example in the case of electric arc welding electrodes of different degrees of hardness. In welding the lower part of the rail head a softer welding material is used first, while the uppermost layer, including the running surface, is welded with a special hard material corresponding to the material of the rails.

The value of the invention resides in the fact that welds, which are in themselves sensitive and not fully capable of withstanding the stresses to which they are subjected under the conditions of railway working, are either avoided or completely relieved of stress, mechanically, by web and fish plate riveting, and more particularly by fish plate riveting, and are capable of perfectly answering their purpose of conducting the wheel travelling thereover smoothly from one rail to the other. In consequence of the favourable stressing of all the parts, the design of rail joint according to the invention provides unusually great strength.

Since, with the joint according to the invention, the ends of the rails are not displaceable relatively to each other it is not necessary to take account of expansion due to heat. The butt joints may therefore be made so close that they are practically imperceptible during travel thereover, so that it becomes superfluous to weld. The hammering action of the wheels travelling over the joint has the effect of bringing the upper edges of the abutting ends of the rails tightly together. In order to obtain as small gaps as possible at the joints it is advisable to plane the end surfaces of the ends of the rails and to true them up to be strictly parallel to each other.

We claim:

1. A railway rail joint, comprising a pair of rails arranged end to end, a pair of fish plates disposed respectively on opposite sides of the rail webs in contact therewith, said webs and plates having aligned rivet holes extending therethrough, said holes being enlarged at the planes of contact between said webs and plates, and rivets in said holes, said rivets being upset in said holes so as to be enlarged and fill out the enlargements of the rivet holes at said planes of contact so that the cross-sectional areas and shear resisting capacity of the rivets is greater at the planes where the shear is applied thereto in use, whereby fewer rivets and shorter fish plates can be used for joining the rail ends.

2. A railway rail joint according to claim 1 and in which the rails are welded together solely at the heads for providing a smooth track but in which the stress is carried principally by the fish plates to avoid rupture of the weld.

FRANZ VÁSÁRHELYI.
FRANZ TAJOVSKY.